United States Patent
Can et al.

(10) Patent No.: US 12,412,239 B1
(45) Date of Patent: Sep. 9, 2025

(54) OPTICAL RESOLUTION DETERMINATION FROM BARCODE CHART IMAGES

(71) Applicant: Amazon Technologies, Inc., Seattle, WA (US)

(72) Inventors: Ali Can, Andover, MA (US); Frank Preiswerk, Brooklyn, NY (US)

(73) Assignee: Amazon Technologies, Inc., Seattle, WA (US)

(*) Notice: Subject to any disclaimer, the term of this patent is extended or adjusted under 35 U.S.C. 154(b) by 356 days.

(21) Appl. No.: 18/127,426

(22) Filed: Mar. 28, 2023

(51) Int. Cl.
| | | |
|---|---|---|
| *G06T 3/40* | (2024.01) | |
| *G06K 7/14* | (2006.01) | |
| *G06T 7/20* | (2017.01) | |
| *G06T 7/62* | (2017.01) | |
| *G06T 9/00* | (2006.01) | |
| *H04N 23/73* | (2023.01) | |

(52) U.S. Cl.
CPC ............. *G06T 3/40* (2013.01); *G06K 7/1413* (2013.01); *G06T 7/20* (2013.01); *G06T 7/62* (2017.01); *G06T 9/00* (2013.01); *H04N 23/73* (2023.01)

(58) Field of Classification Search
None
See application file for complete search history.

(56) References Cited

U.S. PATENT DOCUMENTS

| | | | | |
|---|---|---|---|---|
| 5,969,325 | A * | 10/1999 | Hecht | G06K 7/1443 235/455 |
| 2006/0202040 | A1 * | 9/2006 | Wang | G06K 7/14 235/462.27 |
| 2007/0285537 | A1 * | 12/2007 | Dwinell | G06T 7/001 348/263 |
| 2011/0155808 | A1 * | 6/2011 | Santos | G06K 7/146 235/462.15 |
| 2012/0173347 | A1 * | 7/2012 | De Almeida Neves | G06K 7/10861 705/16 |
| 2013/0256417 | A1 * | 10/2013 | Lee | G06K 7/1452 235/462.16 |
| 2016/0267308 | A1 * | 9/2016 | Nishi | G06K 7/10831 |

* cited by examiner

*Primary Examiner* — Leon Flores
(74) *Attorney, Agent, or Firm* — Kilpatrick Townsend & Stockton LLP

(57) ABSTRACT

Techniques for optical resolution determination from barcode chart images are described herein. In an example, a computer system receives an image captured by an image acquisition system having a camera with a lens. The image is of a chart including barcode sets arranged in one or more orientations with respect to an optical axis of the camera, and individual barcodes of a barcode set have a barcode attribute. The computer system decodes the barcode sets in the image using a barcode decoder. The computer system determines, for individual barcode attributes and for individual orientations, a number of decoded barcodes in the barcode sets that match encoded information stored in a barcode manifest. The computer system determines a resolution metric of the image acquisition system for a target barcode decode rate based on a distribution of a decode rate associated with the barcode attribute for the decoded barcodes.

20 Claims, 10 Drawing Sheets

OPTICAL RESOLUTION DETERMINATION FROM BARCODE CHART IMAGES

BACKGROUND

Optical resolution is the ability of a camera to optically capture finely spaced details in acquired images. The overall resolution of a vision system depends on a number of factors including lens resolution, lens aperture, pixels size, signal-to-noise ratio (SNR) of the sensor, image contrast, and image signal processing on the camera. Modulation Transfer Function (MTF) is a common method for measuring the optical performance of a vision system. Generally, as the spatial frequency increases, the contrast keeps decreasing until adjacent lines become visually undistinguishable.

BRIEF DESCRIPTION OF THE DRAWINGS

Various embodiments in accordance with the present disclosure will be described with reference to the drawings, in which.

DETAILED DESCRIPTION

Figure 1:
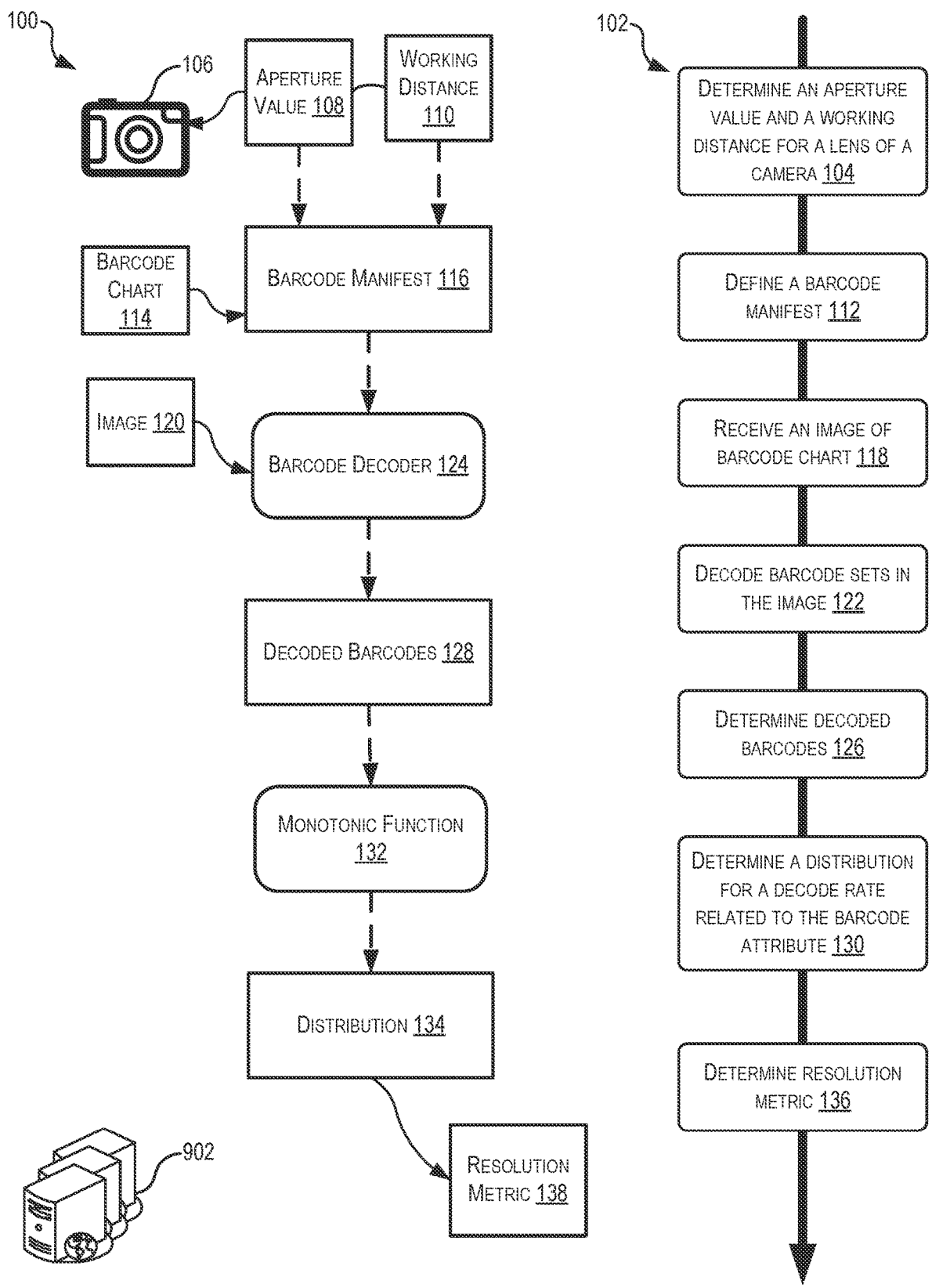
FIG. 1 illustrates an example block diagram and associated flowchart showing a process for implementing techniques relating to determining an optical resolution from a barcode chart image, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, various techniques for optical resolution determination from barcode chart images. A computing device can perform operations relating to determining resolution metrics for lenses of cameras included in image acquisition systems based on decoding images of barcode charts. In an example, a set of barcodes with different sizes (e.g., different lengths, widths, line thicknesses, etc.) are generated and placed in horizontal and vertical orientations on a chart. Each barcode in the set can have a different barcode attribute, which may refer to the smallest barcode line width of the barcode. In general, as the barcode attribute gets smaller and smaller, the contrast between the lines keeps dropping, and at some point, the barcode may become not decodable. The computing device can define resolution metrics based on barcode decodability of images of the chart. The resolution metrics may be computed in both horizontal and vertical directions. Alternatively, the barcodes could be placed in the chart alternating between radial and tangential orientations, and the resolution metrics can be determined in the radial and tangential orientations. The computing device can fit a parametric model to represent the barcode decodability distribution and determine the minimum line width that is decodable for a target decode rate. The resolution metric can correlate with industry standard metrics.

In a particular example, a computing device, such as a webserver, a personal computing device, a tablet computer, a smartphone, or the like, can receive an image captured by an image acquisition system including a camera having a lens. The image can be an image of a barcode chart that has sets of barcodes with different barcode attributes. The barcode chart may include two sets of four barcodes in a horizontal orientation and two sets of four barcodes in a vertical orientation. The four barcodes in each set may have a different X dimension, representing the smallest barcode line width of the barcode for a one-dimensional barcode. For instance, the X dimensions of the barcodes may be 9.2 mil, 10.8 mil, 13.3 mil, and 17.5 mil. For a two-dimensional barcode, the X dimension may be the width and height of the smallest 'pixel'. The image can be processed by a barcode decoder to decode the barcodes in the image. The barcode decoder can decode encoded information for the barcodes. The computing device can determine whether the decoded information for a barcode matches encoded information that is stored in a barcode manifest and includes features about the barcodes (e.g., the X dimension, the orientation, the location in the chart, etc.). If the decoded information matches the encoded information in the barcode manifest, the barcode can be considered to be a decoded barcode. The computing device can determine a number of decoded barcodes for each X dimension and in each of the vertical orientation and the horizontal orientation. The computing device can then determine a distribution of a decode rate associated with the X dimension for the decoded barcodes. From the distribution, the computing device can determine a resolution metric for the image acquisition system that corresponds to an X dimension for a target barcode decode rate. For instance, the resolution metric may be 10 mil for a target barcode decode rate of 90%. Accordingly, resolution metrics of the image acquisition system using different lenses may be compared to select a lens for use with a camera. The resolution metric may additionally allow the resolving power of a camera sensor to be evaluated as a function of analog gain and image signal processing parameters. The barcode chart need not be on a planar surface, so the barcodes may be placed on different faces of three-dimensional objects to evaluate the performance of the system in dynamic scenes or for lens focusing applications.

The techniques described herein may be more robust to illumination changes and partial views compared to conventional resolution-metric techniques such as the modulation transfer function and the slanted edge method. The resolution metric of the embodiments of the present disclosure may also be a relevant performance metric for applications such as computer vision systems designed for decoding barcodes. The same metric could be used to measure the overall performance as a function of signal-to-noise ratio, image contrast, and different image signal processing parameters.

Turning now to the figures, FIG. 1 illustrates an example block diagram 100 and associated flowchart showing a process 102 for implementing techniques relating to determining an optical resolution from a barcode chart image, according to at least one example. The diagram 100 depicts devices, objects, and the like that correspond to the process 102. The process 102 can be performed by any suitable combination of hardware and/or software, as described herein.

FIGS. 1, 2, 5, and 8 illustrate example flow diagrams showing respective processes 102, 200, 500, and 800, as described herein. The processes 102, 200, 500, and 800, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A resolution determination engine 910 (FIG. 9) embodied in a computer system 902 (FIG. 9) and/or within a user device 904 (FIG. 9) may perform the process 102. Thus, while the description below is from the perspective of the computer system 902, the user device 904 may also perform the process 102 or portions of the process 102.

The process 102 may begin at block 104 by the computer system 902 determining an aperture value 108 and a working distance 110 for a lens of a camera 106. The lens and the camera 106 may be part of an image acquisition system. The aperture value 108 represents the opening in the lens through which light passes to enter the camera 106. The working distance 110 represents the distance between an object and a leading edge of the lens. In this case, the object is a barcode chart 114 that includes barcodes arranged in sets. Each barcode has an attribute that may be different from the barcode attributes of other barcodes in the set. For instance, the barcode attribute may be an X dimension representing a width of a thinnest line in the barcode. Another example of a barcode attribute may be an average thickness of lines in the barcode. The sets of barcodes in the barcode chart 114 may be arranged in various orientations. For instance, the sets of barcodes may be arranged in rows and columns with the barcodes being in horizontal and vertical orientations. In the horizontal orientation, individual lines of a barcode are vertical, whereas in the vertical orientation, individual lines of a barcode or horizontal. As another example, the sets of barcodes may be oriented radially and tangentially around a center of the barcode chart 114.

The aperture value 108 may be set to a test value, such as F #4, F #5.6, F #8, or any other suitable test value. The working distance 110 may be set based on a size of the barcode chart 114. For instance, the working distance 110 can be set so that a focal plane of the lens is at the barcode chart 114, while the field of view of the camera 106 can capture all of the barcodes of the barcode chart 114. Examples of the working distance 110 may be 1352 mm, 1765 mm, 1800 mm, 2730 mm, or any other suitable working distance.

The process 102 may continue at block 112 by the computer system 902 defining a barcode manifest 116. The barcode manifest 116 can include encoded information associated with the barcodes of the barcode chart 114. Regardless of whether the barcodes are in vertical and horizontal orientations or if the barcodes are in radial and tangential orientations with respect to the center of the barcode chart 114, the encoded information can include a size identifier indicating the barcode attribute (e.g., X dimension) of the barcodes in the barcode chart 114. If the barcodes are arranged in rows and columns in horizontal and vertical orientations, the encoded information can additionally include a location identifier indicating a row position and a column position for each barcode and an orientation identifier of the horizontal orientation or the vertical orientation for each barcode. If the barcodes are in a radial orientation and a tangential orientation, the encoded information can additionally include a location identifier indicating a radial distance or a tangential distance for the barcode from an optical axis of the camera 106 for each barcode and an orientation identifier of the radial orientation or the tangential orientation for each barcode.

In any case, the encoded information for each barcode in the barcode chart 114 may be a predefined number of digits. Examples of the barcodes include universal product code (UPC) barcodes, interleaved two of five (ITF) barcodes, international article number (BAN) barcodes, quick response (QR) barcodes, or any other suitable one-dimensional, two-dimensional, or three-dimensional barcodes. A first subset of the digits can be fixed for the barcodes, a second subset of the digits can represent the location identifier of the barcode, a third subset of the digits represent the size identifier for the barcode attribute of the barcode, and the fourth subset of the digits can represent the orientation identifier of the barcode. For UPC barcodes, the predefined number of digits may be 12 digits. So, the first six digits may be fixed, the next two digits for the location identifier, two digits for the size identifier, and two digits for the orientation identifier.

The process 102 may continue at block 118 by the computer system 902 receiving an image 120 of the barcode chart 114. The image 120 can be an image of the barcode chart 114 generated by the camera 106 using the lens with the determined aperture value 108 and working distance 110. Before generating the image 120, the lens may be adjusted either manually or mechanically to focus the lens.

The process 102 may continue at block 122 by the computer system 902 decoding the barcode sets in the image 120. The image 120 can be processed by a barcode decoder 124 to decode the barcode sets. The barcode decoder 124 can be an off-the-shelf barcode reader that scans the barcodes depicted in the image 120.

The process 102 may continue at block 126 by the computer system 902 determining decoded barcodes 128. A barcode may be considered a decoded barcode if the information decoded by the barcode decoder 124 matches the encoded information for that barcode in the barcode manifest 116. Barcodes that are not decoded or are decoded as an incorrect value are not considered to be decoded barcodes.

The process 102 may continue at block 130 by the computer system 902 determining a distribution 134 of a decode rate related to the barcode attribute. Based on the decoded barcodes 128, the computer system 902 can determine a number of decoded barcodes in each orientation and having a particular barcode attribute. That is, if the barcode attribute is the X dimension of the barcode and the orientations are horizontal and vertical, the computer system 902 can determine the number of decoded barcodes at each X dimension and in each of the horizontal orientation and vertical orientation that are included in the decoded barcodes 128. The computer system 902 may then fit a monotonic function 132 based on the number of decoded barcodes for individual barcode attributes and orientations to determine the distribution 134. The distribution 134 may represent a barcode decode rate as a function of the X dimension. Examples of the monotonic function include a sigmoid function, a hyperbolic tangent function, or an arctangent function. For a two parameter sigmoid function, the parameters of the model can be estimated by two approaches using least squares fit and exact fit. In the exact fit method, the parameters are determined analytically from two points near the target value. One point is determined such that its decode size is smallest among the points above the target value, while the second point is determined such that its decode size is largest among the points below the target value. The least squares method results in overestimation of the parameters when the distribution has a heavy tail. So, the exact fit method can be used when possible and then linear interpolation can be used when the logarithms are degenerate.

The process 102 may continue at block 136 by the computer system 902 determining a resolution metric 138 of the image acquisition system. The computer system 902 may determine the resolution metric 138 in each orientation, such as the horizontal orientation and the vertical orientation or the radial orientation and the tangential orientation. In an example, the resolution metric 138 may correspond to a barcode attribute value at a target barcode decode rate that can be determined from the distribution 134. The resolution metric 138 may represent a resolving power of the lens, which is an ability to distinguish line pair widths at the target barcode decode rate in images generated by the camera 106. So, the resolution metric 138 at a target barcode decode rate of 85% corresponds to a barcode attribute value (e.g., X dimension) that is distinguishable from images generated using the camera 106 with the lens in 85% of barcodes that include the particular barcode attribute value.

Figure 2:
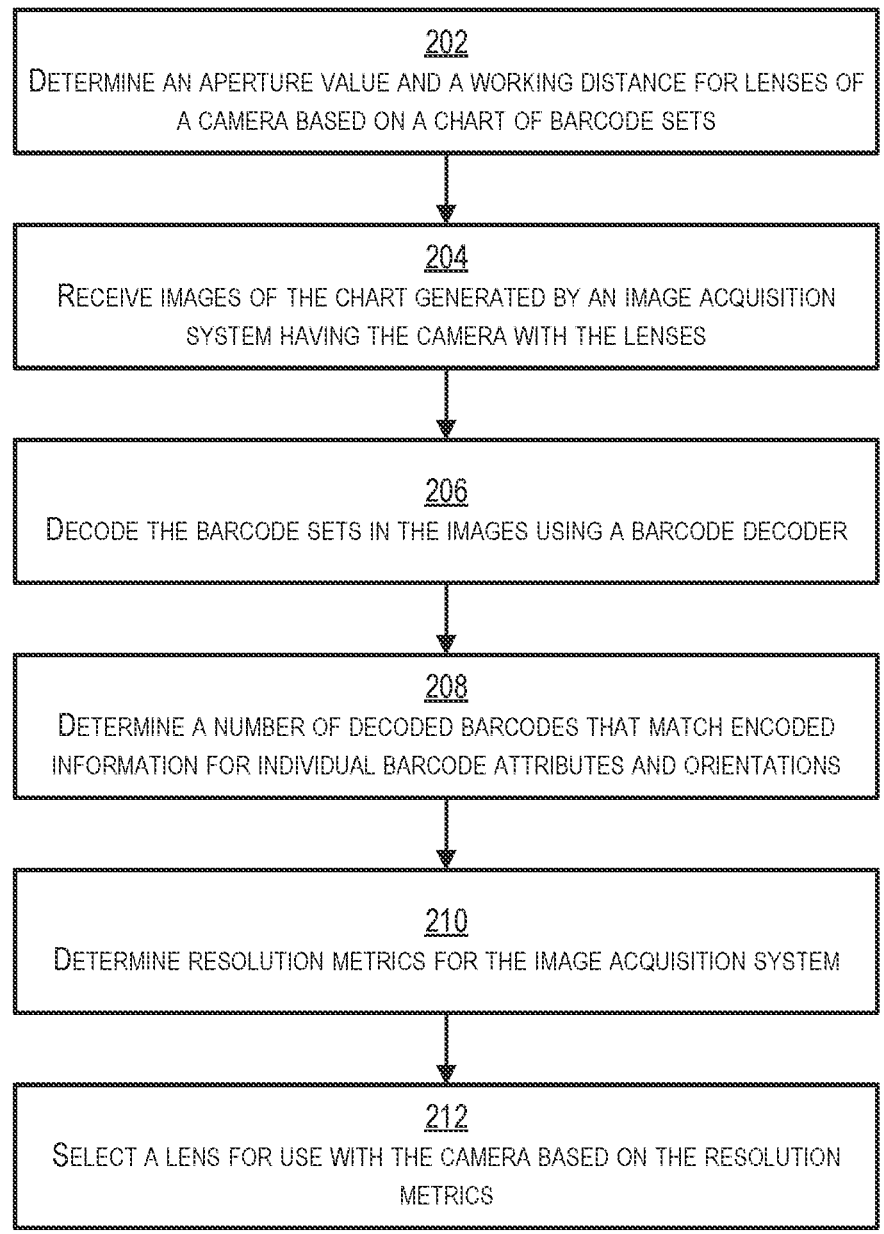
FIG. 2 illustrates an example flowchart showing a process for implementing techniques relating to selecting a lens based on resolution metrics, according to at least one example.

FIG. 2 illustrates an example flowchart showing a process 200 for implementing techniques relating to selecting a lens based on resolution metrics, according to at least one example. The resolution determination engine 910 (FIG. 9) embodied in the computer system 902 (FIG. 9) and/or within the user device 904 (FIG. 9) may perform the process 200. Thus, while the description below is from the perspective of the computer system 902, the user device 904 may also perform the process 200 or portions of the process 200.

The process 200 may begin at block 202 by the computer system 902 determining an aperture value and a working distance for lenses of a camera based on a chart of barcode sets. The aperture value may be set to a test value and the working distance may be set based on a size of the barcode chart. The lens can be adjusted either manually or mechanically to focus the lens based on the aperture value and working distance. Each barcode has a barcode attribute (e.g., X dimension, average line width, etc.) that may be different from the barcode attributes of other barcodes in the set. The sets of barcodes in the barcode chart may be arranged in horizontal and vertical orientations or in radial and tangential orientations.

The process 200 may continue at block 204 by the computer system 902 receiving images of the chart generated by an image acquisition system having the camera with the lenses. One image may be taken by the camera with each lens. So, if two lenses are being compared, a first image may be taken of the barcode chart with the camera using a first lens and a second image may be taken of the barcode chart with the camera using a second lens.

The process 200 may continue at block 206 by the computer system 902 decoding the barcode sets in the images using a barcode decoder. The barcode decoder can be applied to the individual image to decode the barcodes in the images.

The process 200 may continue at block 208 by the computer system 902 determining a number of decoded barcodes that match encoded information for individual barcode attributes and orientations. For the individual images, the number of decoded barcodes having the individual barcode attributes can be determined for each orientation. A barcode can be determined to be decoded if the decoded information determined by the barcode decoder matches the encoded information for a barcode that is stored in a barcode manifest. The encoded information includes location information about the barcode, barcode attribute information about a size of the barcode, and orientation information about the orientation of the barcode. The encoded information can also include any other suitable information.

The process 200 may continue at block 210 by the computer system 902 determining resolution metrics for the image acquisition system. A resolution metric may correspond to an individual image and an individual orientation. So, a first resolution metric may be generated for horizontally-oriented barcodes in the first image generated using the first lens, a second resolution metric may be generated for vertically-oriented barcodes in the first image generated using the first lens, a third resolution metric may be generated for horizontally-oriented barcodes in the second image generated using the second lens, and a fourth resolution metric may be generated for vertically-oriented barcodes in the second image generated using the second lens. The resolution metrics can correspond to a barcode attribute value for a target barcode decode rate, which can be determined by calculating a decode rate distribution from the number of decoded barcodes.

The process 200 may continue at block 212 by the computer system 902 selecting a lens for use with the camera based on the resolution metrics. For the individual lenses, the computer system 902 may determine an average resolution metric. For example, for the first lens, the computer system 902 can determine an average of the first resolution metric and the second resolution metric for the image acquisition system, and for the second lens, the computer system 902 can determine an average of the third resolution metric and the fourth resolution metric for the image acquisition system. The computer system 902 can then select the lens that is associated with a better average resolution metric. So, if the resolution metric represents an X dimension that is decodable 75% of the time, the computer system 902 may select the lens that has a lower average resolution metric for the image acquisition system.

Figure 3:
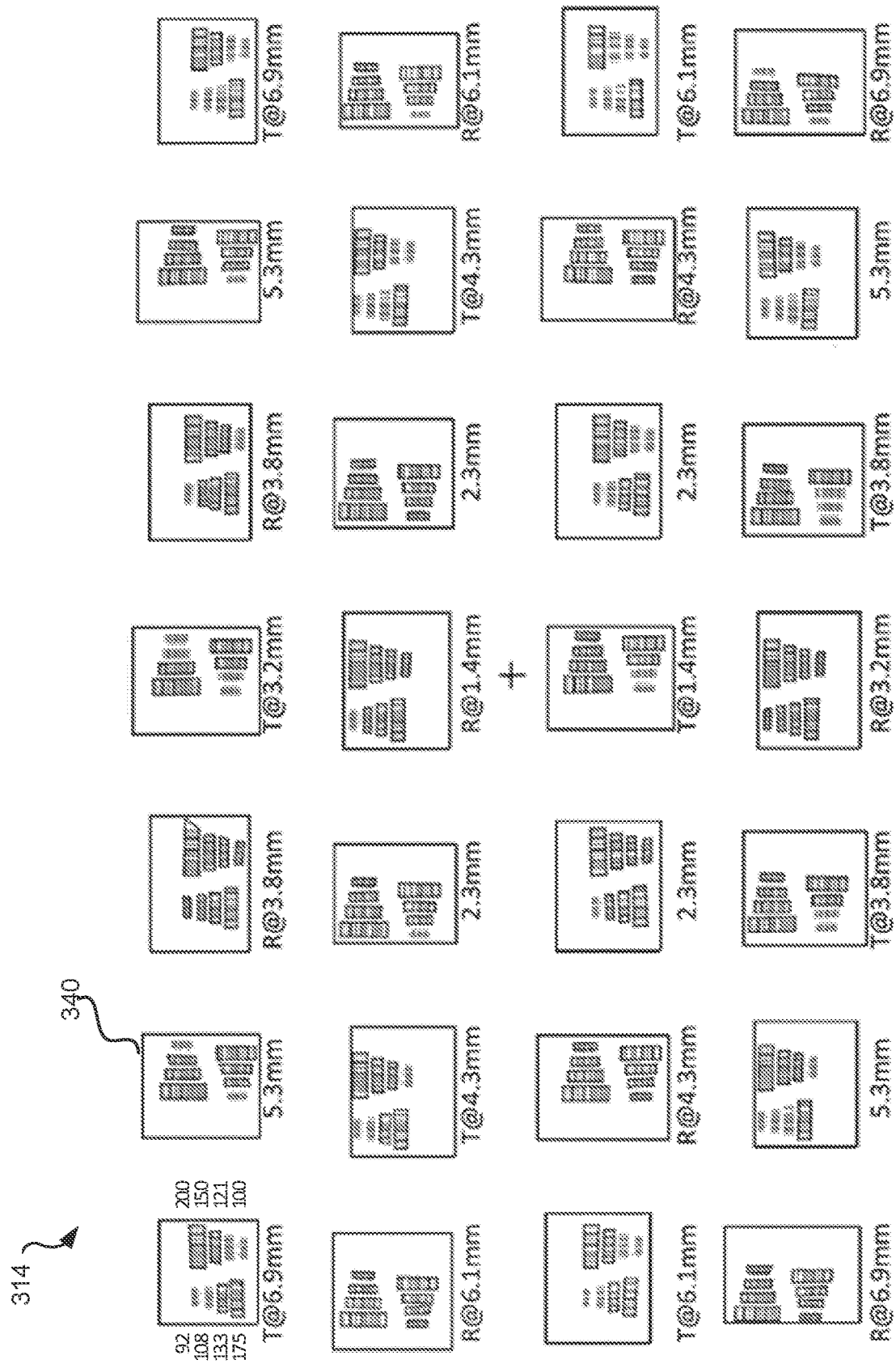
FIG. 3 illustrates an example of a barcode chart, according to at least one example.

FIG. 3 illustrates an example of a barcode chart 314, according to at least one example. Barcode chart 314 is illustrated as including twenty-eight barcode sets 340, but other examples of barcode charts may include a different number of barcode sets. The barcode sets 340 are arranged in rows and columns, but are considered to be in a radial orientation and a tangential orientation with respect to a center of the barcode chart 314. A barcode set that has more of a radial orientation than a tangential orientation with respect to the center of the barcode chart 314 are labeled with an "R", and otherwise a "T". The barcodes along 45 degrees are not listed as either "R" or "T". Each barcode set 340 is also labeled with a distance to the center of the barcode chart 314.

Each barcode set 340 includes two wedges of barcodes, where each wedge includes four barcodes, for a total of eight barcodes per barcode set. A barcode attribute for each barcode in a barcode set 340 is different from other barcode attributes of other barcodes in the barcode set 340. The barcode attribute of the X dimension for the barcodes in the top left barcode set are labeled in FIG. 3. As illustrated, the X dimensions for the barcodes of the barcode set include 9.2 mil, 10 mil, 10.8 mil, 12.1 mil, 13.3 mil, 15 mil, 17.5 mil, and 20 mil. Other X dimensions are also possible.

An image of the barcode chart 314 can be generated by a camera having a lens set to a particular aperture value and working distance. The image can then be decoded by a barcode decoder. As an example, boxes are shown around barcodes that may be decoded by the barcode decoder based on encoded information that is stored in a barcode manifest associated with the barcode chart 314. Once decoded, a distribution of the decode rates with respect to the barcode attributes can be determined, which can be used to determine a resolution metric of the camera.

Although the barcode sets 340 in FIG. 3 are labeled as being radially oriented or tangentially oriented, the barcode sets 340 may alternatively be considered to be horizontally oriented or vertically oriented based on the directions of the lines in each barcode. Horizontally-oriented barcodes have vertical barcode lines and vertically-oriented barcodes have horizontal barcode lines. So, the top left barcode set has horizontally-oriented barcodes and the bottom left barcode set has vertically-oriented barcodes. Table 1 illustrates numbers of decoded barcodes for the horizontal and vertical orientations. As shown, the number of decoded barcodes may decrease as the barcode size (X dimension) decreases.

Figure 4:
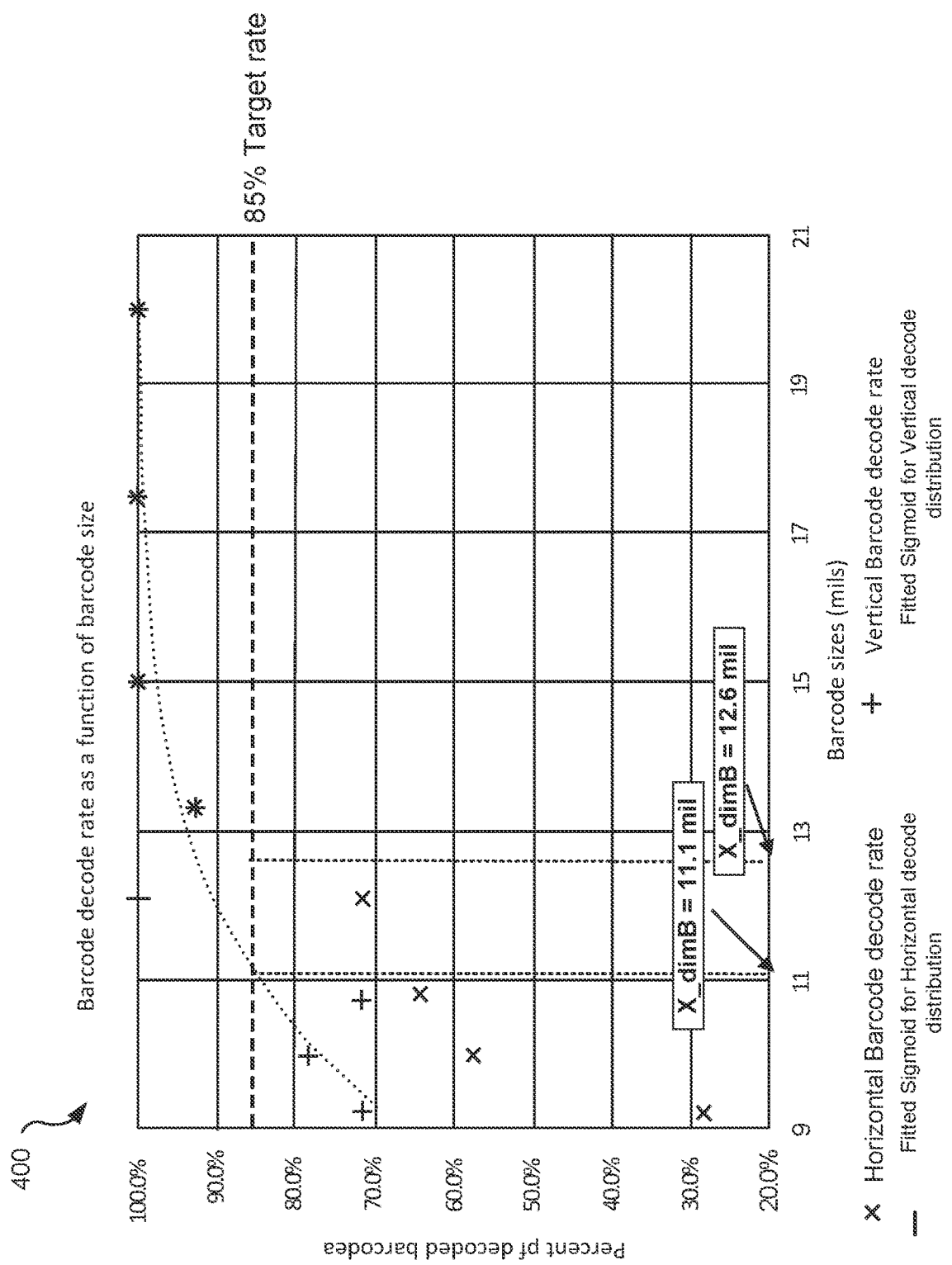
FIG. 4 illustrates an example graph of a distribution of barcode decode rates as a function of barcode size, according to at least one example.

FIG. 4 illustrates an example graph 400 of a distribution of barcode decode rates as a function of barcode size, according to at least one example. The decode rates may correspond to those shown in Table 1. In addition, the decode rates in the vertical orientation and the horizontal orientation may be individually fit to a monotonic function. In FIG. 4, the monotonic function is a sigmoid function, but other examples may use a different monotonic function.

The distributions may be usable to determine a resolution metric in each orientation for the image acquisition system having a lens that was used to generate the image. For instance, the resolution metric may be a barcode size (X dimension) that correlates to a target barcode decode rate based on the distribution. The target barcode decode rate of 85% is illustrated on the graph 400. Based on the distribution in the graph 400, the resolution metric for the horizontal orientation is 12.6 mil and the resolution metric for the vertical distribution is 11.1 mil.

Figure 5:
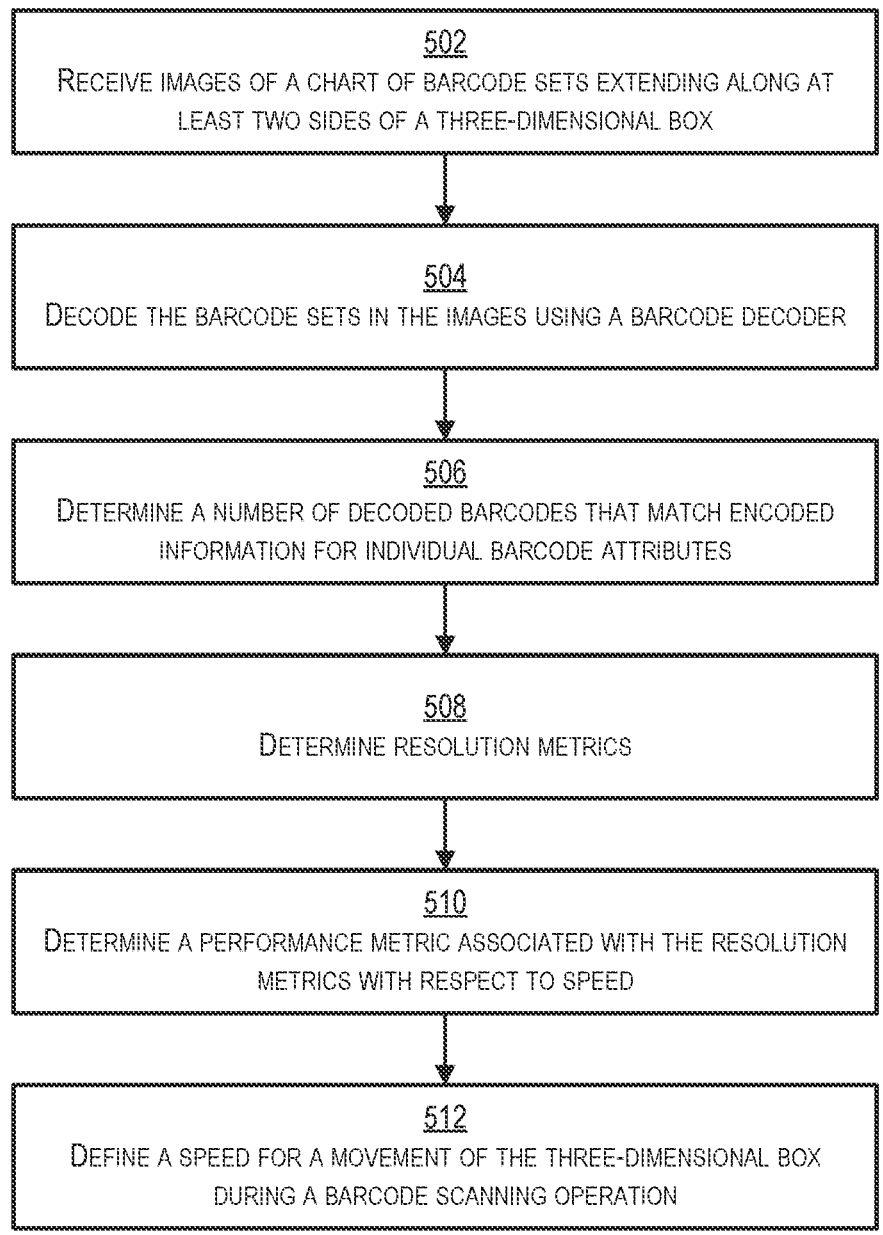
FIG. 5 illustrates an example flowchart showing a process for implementing techniques relating to determining resolution metrics for three-dimensional barcode charts, according to at least one example.

FIG. 5 illustrates an example flowchart showing a process 500 for implementing techniques relating to determining resolution metrics for three-dimensional barcode charts, according to at least one example. The resolution determination engine 910 (FIG. 9) embodied in the computer system 902 (FIG. 9) and/or within the user device 904 (FIG. 9) may perform the process 500. Thus, while the description below is from the perspective of the computer system 902, the user device 904 may also perform the process 500 or portions of the process 500.

The process 500 may begin at block 502 by the computer system 902 receiving images of a chart of barcode sets extending along at least two sides of a three-dimensional box. In other examples, the chart of barcode sets may only be on one side of a three-dimensional object or may be on multiple, non-adjacent sides (e.g., opposite sides) of the three-dimensional object. Each barcode has a barcode attribute (e.g., X dimension, average line width, etc.) that may be different from the barcode attributes of other barcodes in the set. Each image can be generated by an image acquisition system having a camera using a same lens that has a same aperture value and working distance. But, the images can be generated while the three-dimensional box is moved at different speeds with respect to the camera. As an example, the three-dimensional box may be moved towards and away from the camera at varying speeds as the camera captures the images of the barcode chart.

The process 500 may continue at block 504 by the computer system 902 decoding the barcode sets in the images using a barcode decoder.

The process 500 may continue at block 506 by the computer system 902 determining a number of decoded barcodes that match encoded information for individual barcode attributes. For the individual images, the number of decoded barcodes having the individual barcode attributes can be determined. A barcode can be determined to be decoded if the decoded information determined by the barcode decoder matches the encoded information for a barcode that is stored in a barcode manifest. The encoded

TABLE 1

| Barcode Sizes in the manifest (mils) | 20 | 17.5 | 15 | 13.3 | 12.1 | 10.8 | 10 | 9.2 |
|---|---|---|---|---|---|---|---|---|
| Number of Horizontal Barcodes decoded for each size | 14 | 14 | 14 | 13 | 10 | 9 | 8 | 4 |
| Percent of Horizontal Barcodes decoded for each size | 100.0% | 100.0% | 100.0% | 92.9% | 71.4% | 64.3% | 57.1% | 28.6% |
| Number of Vertical Barcodes decoded for each size | 14 | 14 | 14 | 13 | 14 | 10 | 11 | 10 |
| Percent of Vertical Barcodes decoded for each size | 100.0% | 100.0% | 100.0% | 92.9% | 100.0% | 71.4% | 78.6% | 71.4% | information includes location information about the barcode, barcode attribute information about a size of the barcode, and face information about which face of the three-dimensional box the barcode is positioned on. The encoded information can also include any other suitable information.

The process 500 may continue at block 508 by the computer system 902 determining resolution metrics for the images. A resolution metric may correspond to an individual image. So, a first resolution metric may be generated for a first image of the three-dimensional box moving at a first speed and a second resolution metric may be generated for a second image of the three-dimensional box moving at a second speed. The resolution metrics can correspond to a barcode attribute value for a target barcode decode rate, which can be determined by calculating a decode rate distribution from the number of decoded barcodes.

The process 500 may continue at block 510 by the computer system 902 determining a performance metric associated with the resolution metrics with respect to speed. The performance metric may represent the decodability of barcodes having a particular barcode attribute at a particular speed. The computer system 902 may determine a performance drop as a function of motion speed can for a set of given camera and lens parameters.

The process 500 may continue at block 512 by the computer system 902 defining a speed for a movement of the three-dimensional box during a barcode scanning operation. The speed can be based on the resolution metrics and the performance metric. For instance, the speed may be selected so that the resolution metric and the performance both satisfy respective thresholds. Then, future barcode scanning operations can use the speed so barcodes can be decoded at a target barcode decode rate.

Figure 6:
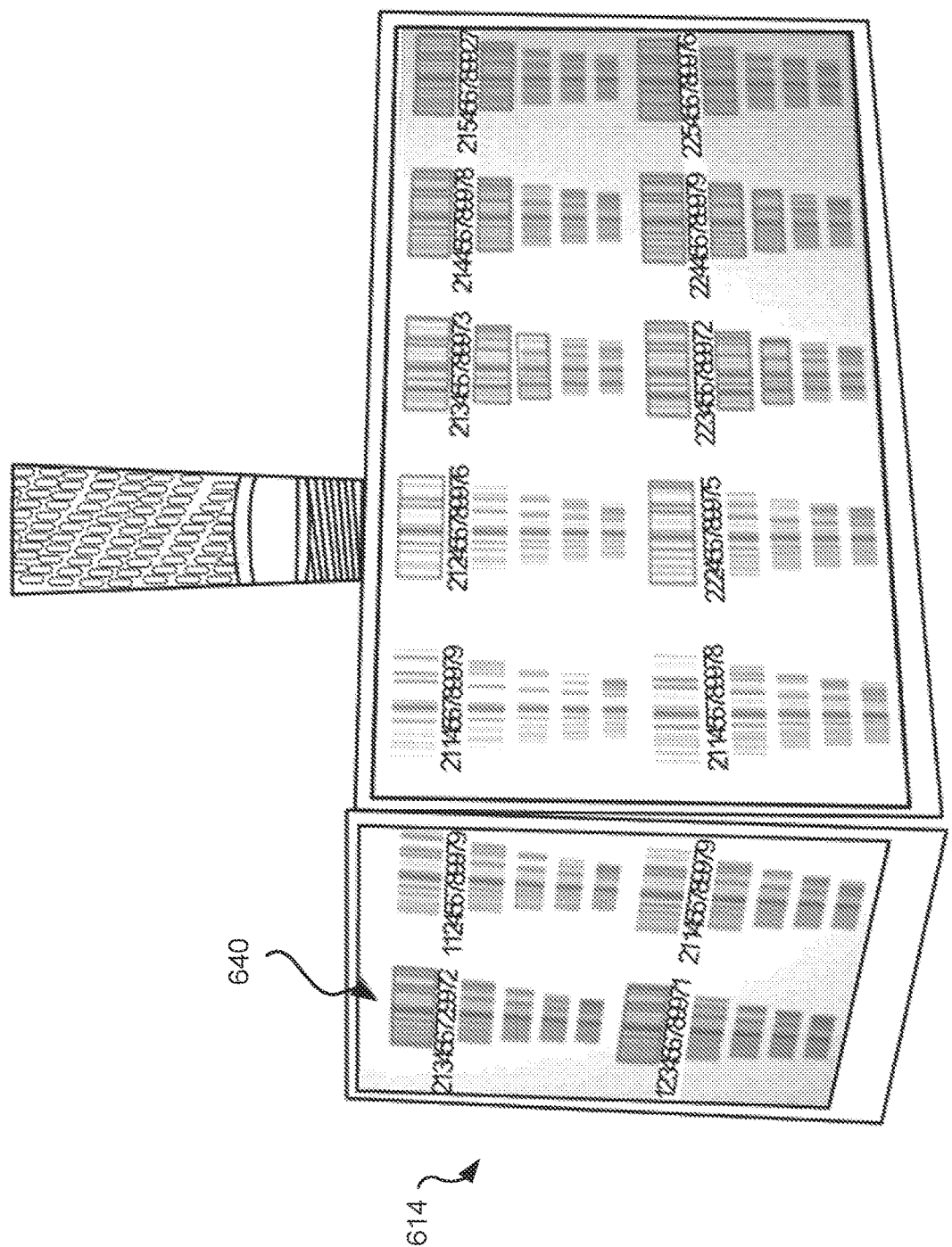
FIG. 6 illustrates an example of a three-dimensional barcode chart, according to at least one example.

FIG. 6 illustrates an example of a three-dimensional barcode chart 614, according to at least one example. Barcode chart 614 is illustrated as including fourteen barcode sets 640 extending along two adjacent sides of a three-dimensional object. The other sides of the three-dimensional object may additionally include barcode sets. The barcode sets 640 are arranged in rows and columns.

Each barcode set 640 includes a wedge with five barcodes. A barcode attribute for each barcode in a barcode set 640 is different from other barcode attributes of other barcodes in the barcode set 640. The barcode attribute may be the X dimension or average line width for the barcode. Each barcode can include encoded information that is included in a barcode manifest for the barcode chart 610. For instance, the encoded information can include a location identifier indicating a position (e.g., row and column) of the barcode on the first side or the second side, a size identifier indicating the barcode attribute of the barcode, and a face identifier indicating the side that the barcode is positioned on.

An image of the barcode chart 614 can be generated by an image acquisition system having a camera with a lens set to a particular aperture value and working distance. The image can then be decoded by a barcode decoder. As an example, boxes are shown around barcodes that may be decoded by the barcode decoder based on encoded information that is stored in a barcode manifest associated with the barcode chart 614. Once decoded, a distribution of the decode rates with respect to the barcode attributes can be determined, which can be used to determine a resolution metric of the image acquisition system.

In an example, multiple images of the barcode chart 614 may be generated by the camera having the same aperture value and working distance while the three-dimensional object is moved at different speeds with respect to the camera. Distributions of decode rates at each speed may be generated and then a performance metric associated with the decodability of barcodes as a function of speed can be determined for the camera and the lens parameters.

Figure 7:
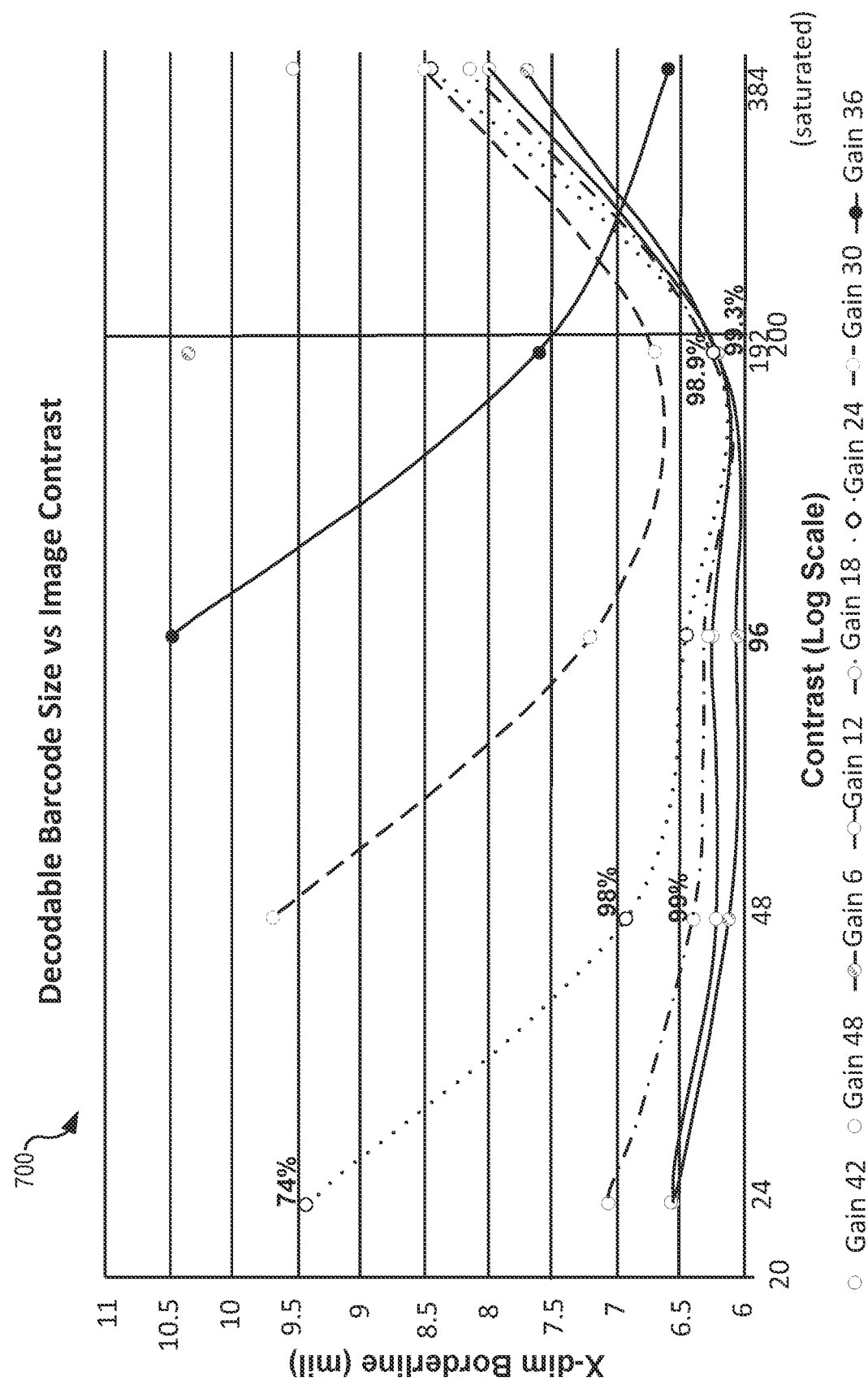
FIG. 7 illustrates an example graph of resolution metrics as a function of image contrast, according to at least one example.

FIG. 7 illustrates an example graph 700 of resolution metrics as a function of image contrast, according to at least one example. The resolution metrics can be determined by fitting a monotonic function to the decode rates for each X dimension. High values of analog gain may amplify acquired electrical charges. But, as the signal is amplified, the noise may also amplified. In FIG. 7, the performance change as a function of image contrast and analog gain is shown. The graph 700 illustrates that analog gains above 24 may cause significant performance drops. The image contrast may be measured as the difference between the white background and black barcode lines. High values of contrast may cause image saturation and degradation of performance. Based on the graph 700, an adjustment for an analog gain setting or a light exposure setting for a camera may be determined.

Figure 8:
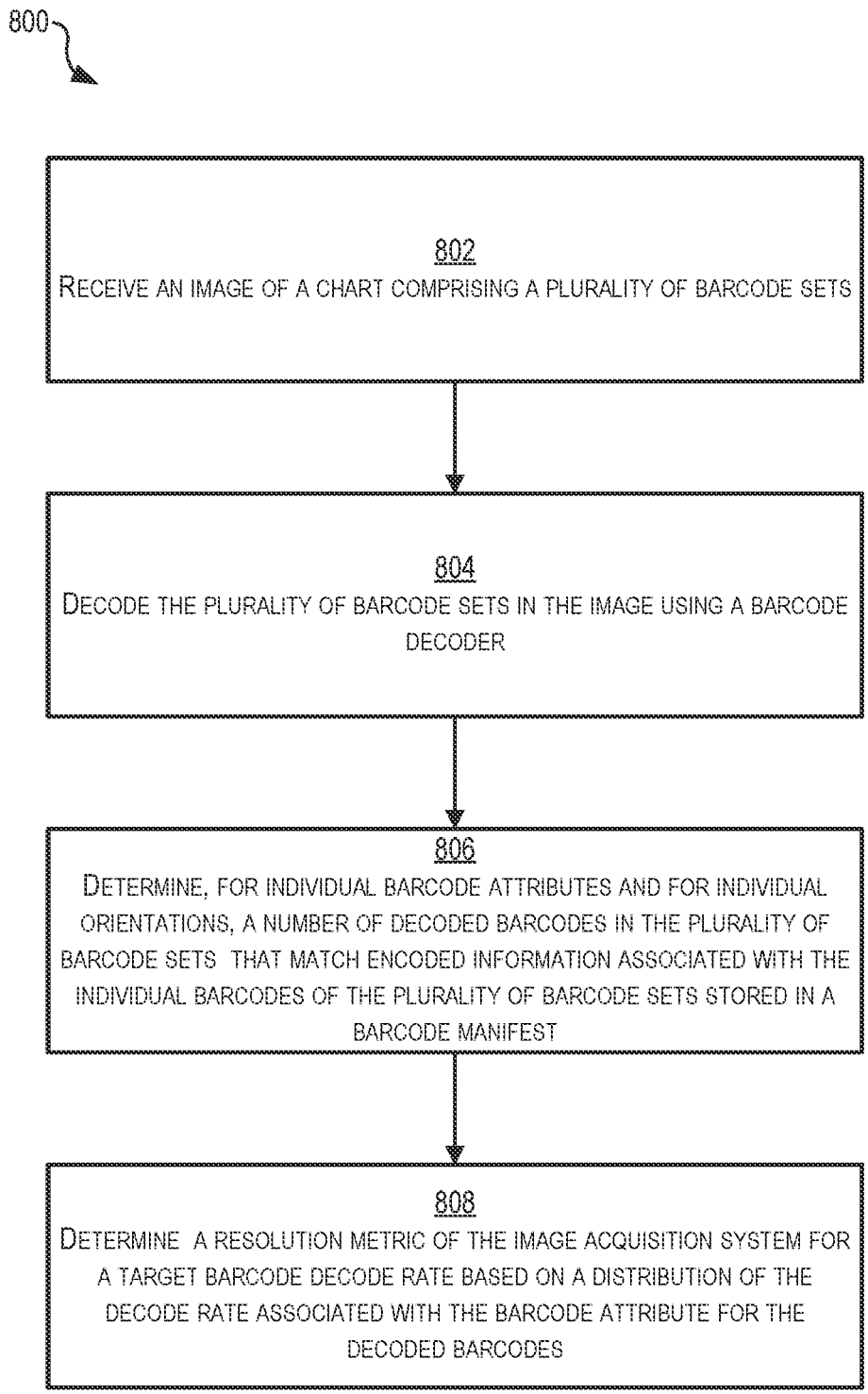
FIG. 8 illustrates an example flowchart showing a process for implementing techniques relating to determining an optical resolution from a barcode chart image, according to at least one example.

FIG. 8 illustrates an example flowchart showing a process 800 for implementing techniques relating to determining an optical resolution from a barcode chart image, according to at least one example. The resolution determination engine 910 (FIG. 9) embodied in the computer system 902 (FIG. 9) and/or within the user device 904 (FIG. 9) may perform the process 800. Thus, while the description below is from the perspective of the computer system 902, the user device 904 may also perform the process 800 or portions of the process 800.

The process 800 may begin at block 802 by the computer system 902 receiving an image 120 (FIG. 1) of a chart 114 (FIG. 1) comprising a plurality of barcode sets. The image 120 is captured by an image acquisition system having a camera 106 (FIG. 1) with a lens. The computer system 902 can determine an aperture value 108 (FIG. 1) and a working distance 110 for the lens of the camera 106 based on the chart 114. The plurality of barcode sets may be arranged in one or more orientations with respect to an optical axis of the camera 106. In an example, the one or more orientations can include a horizontal orientation and a vertical orientation. A first subset of the plurality of barcode sets can be arranged in the horizontal orientation and a second subset of the plurality of barcode sets can be arranged in the vertical orientation. In another example, the one or more orientations can include a radial orientation and a tangential orientation. A first subset of the plurality of barcode sets can have the radial orientation and a second subset of the plurality of barcode sets can have the tangential orientation. In some instances, the chart 114 may extend along at least two sides of a three-dimensional box with a first subset of the plurality of barcodes sets located on a first side of the three-dimensional box and a second subset of the plurality of barcode sets located on a second side of the three-dimensional box that is adjacent to the first side. The individual barcodes of a barcode set have a barcode attribute. The barcode attribute may be an X dimension representing a width of a thinnest line in a barcode. The barcode attribute of the individual barcodes of a barcode set can be different from the barcode attribute of other barcodes of the barcode set.

The computer system 902 can define a barcode manifest 116 (FIG. 1) including encoded information associated with individual barcodes of the plurality of barcode sets. The encoded information for the individual barcodes can include a predefined number of digits. A first subset of the digits may be fixed for the individual barcodes of the plurality of barcode sets, a second subset of the digits may represent a location identifier of the barcode, a third subset of the digits may represent a size identifier for the barcode attribute of the barcode, and a fourth subset of the digits may represent an orientation identifier of the barcode. In the example of the one or more orientations including the horizontal orientation and the vertical orientation, the chart 114 can include the plurality of barcode sets arranged in at least one row and at least one column. The encoded information for the individual barcodes of the plurality of barcode sets can include: (i) a location identifier indicating a first position of the barcode in the at least one row and a second position of the barcode in the at least one column, (ii) a size identifier indicating the barcode attribute of the barcode, and (iii) an orientation identifier of the horizontal orientation or the vertical orientation of the barcode. In the example of the one or more orientations including the radial orientation and the tangential orientation, the encoded information for the individual barcodes of the plurality of barcode sets can include: (i) a location identifier indicating a radial distance or a tangential distance of the barcode from the optical axis, (ii) a size identifier indicating the barcode attribute of the barcode, and (iii) an orientation identifier of the radial orientation or the tangential orientation of the barcode. In the example of the chart 114 extending along at least two sides of a three-dimensional box, the encoded information for the individual barcodes of the plurality of barcode sets can include: (i) a location identifier indicating a position of the barcode on the first side or the second side, (ii) a size identifier indicating the barcode attribute of the barcode, and (iii) a face identifier indicating the barcode being positioned on the first side or the second side.

The process 800 may continue at block 804 by the computer system 902 decoding the plurality of barcode sets in the image 120 using a barcode decoder 124 (FIG. 1).

The process 800 may continue at block 806 by the computer system 902 determining, for individual barcode attributes and for individual orientations, a number of decoded barcodes 128 (FIG. 1) in the plurality of barcode sets that match encoded information associated with the individual barcodes of the plurality of barcode sets stored in the barcode manifest 116. Each barcode that matches the encoded information in the barcode manifest 116 represents a decoded barcode. The computer system 902 may determine the number of decoded barcodes in at least one of the horizontal orientation and the vertical orientation.

The process 800 may continue at block 808 by the computer system 902 determining a resolution metric 138 (FIG. 1) of the image acquisition system for a target barcode decode rate based on a distribution 134 (FIG. 1) of a decode rate associated with the barcode attribute for the decoded barcodes 128. The resolution metric 138 can correspond to a resolving power representing an ability to distinguish line pair widths at the target barcode decode rate in images generated by the camera 106. The computer system 902 can determine the distribution 134 for the decoded barcodes 128 by fitting a monotonic function 132 (FIG. 1) based on the number of decoded barcodes 128, for the individual barcode attributes and in the individual orientations of the one or more orientations, that match the encoded information in the barcode manifest 116. The computer system 902 may fit a monotonic function based on the number of decoded barcodes for the individual barcode attributes and in the at least one of the horizontal orientation and the vertical orientation that match the encoded information in the barcode manifest and determine the resolution metric 138 of the image acquisition system in the at least one of the horizontal orientation and the vertical orientation for the target barcode decode rate based on the distribution 134 of the decode rates associated with the barcode attribute for the decoded barcodes 128.

In an example, the lens may be a first lens, the image 120 may be a first image, the number of decoded barcodes may be a first number of decoded barcodes, the distribution 134 may be a first distribution, the resolution metric 138 may be a first resolution metric, and the decode rate may be a first decode rate. The computer system 902 can receive another image (e.g., a second image) of the chart 114 generated by the image acquisition system having the camera 106 with another lens (e.g., a second lens), decode the plurality of barcode sets in the other image using the barcode decoder, and determine, for the other image, for the individual barcode attributes, and for the individual orientations of the one or more orientations (e.g., in at least one of the horizontal orientation and the vertical orientation), another number of decoded barcodes in the plurality of barcode sets that match the encoded information in the barcode manifest. Each barcode that matches the encoded information in the barcode manifest represents a decoded barcode. The computer system 902 can determine, for the other image, another distribution (e.g., a second distribution) of the barcode attribute for the decoded barcodes by fitting the monotonic function based on the other number of decoded barcodes for the individual barcode attributes and in the at least one of the horizontal orientation and the vertical orientation that match the encoded information in the barcode manifest, and determine another resolution metric (e.g., a second resolution metric) of the image acquisition system in the at least one of the horizontal orientation and the vertical orientation for the target barcode decode rate based on the other distribution of another decode rate associated with barcode attribute for the decoded barcodes. The computer system 902 can select the other lens for use with the camera 106 based on the resolution metric and the other resolution metric.

In an example of the chart 114 extending along at least two sides of a three-dimensional box, the computer system 902 can receive one or more additional images of the chart 114. The image 120 and the one or more additional images can be generated by the image acquisition system having the camera 106 with a same aperture value and working distance while the three-dimensional box is moved at different speeds with respect to the camera 106. The computer system 902 can decode the plurality of barcode sets in the image 120 and the one or more additional images using the barcode decoder and determine, for the image 120 and individual images of the one or more additional images, the number of decoded barcodes 128 in the plurality of barcode sets that match encoded information associated with the individual barcodes of the plurality of barcode sets stored in the barcode manifest 116, and determine, for the image 120 and the individual images of the one or more additional images, the resolution metric 138 of the image acquisition system for the target barcode decode rate based on the distribution 134 of the decode rate associated with the barcode attribute for the decoded barcodes. The computer system 902 can determine a performance metric associated with the resolution metric 138 with respect to speed for the image 120 and the one or more additional images and define the speed for a movement of the three-dimensional box during a barcode scanning operation based on the performance metric. The computer system 902 may evaluate the resolution metric 138 as a function of a contrast of the image and determine an adjustment for an analog gain setting or a light exposure setting for the camera 106 based on the contrast.

Figure 9:
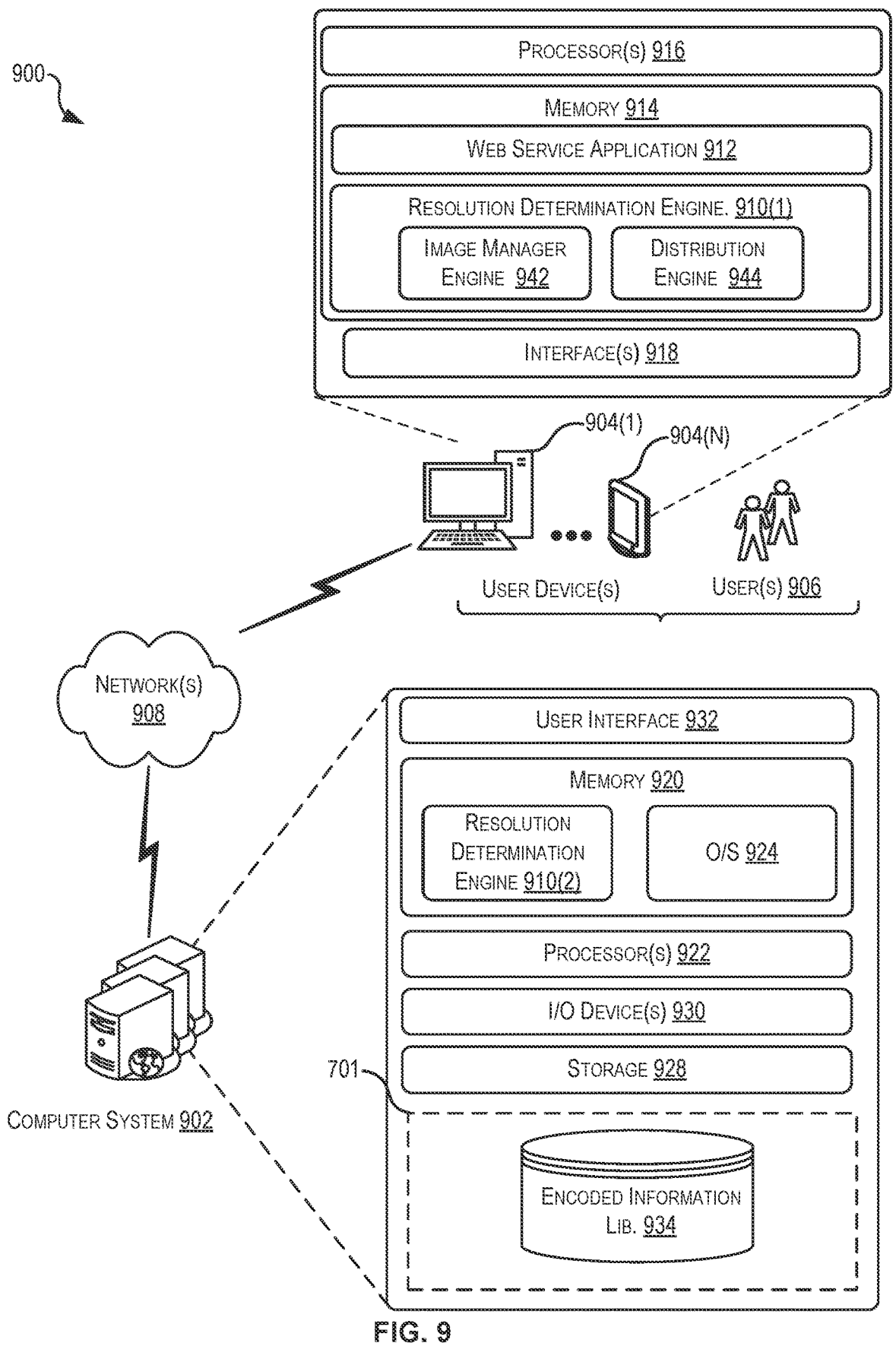
FIG. 9 illustrates an example schematic architecture for implementing techniques relating to determining an optical resolution from a barcode chart image, according to at least one example.

FIG. 9 illustrates an example schematic architecture 900 for implementing techniques relating to determining an optical resolution from a barcode chart image, according to at least one example. The architecture 900 may include a computer system 902 (e.g., the computer system described herein) in communication with one or more user devices 904(1)-904(N) via one or more networks 908 (hereinafter, "the network 908").

The user device 904 may be operable by one or more users 906 to interact with the computer system 902. The users 906 may be administrators, developers, or others that desire to test or utilize operations of the techniques described herein. The user device 704 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 904(1) is illustrated as a desktop computer, while the user device 904(N) is illustrated as an example of a handheld mobile device.

The user device 904 may include a memory 914 and processor(s) 916. In the memory 914 may be stored program instructions that are loadable and executable on the processor(s) 916, as well as data generated during the execution of these programs. Depending on the configuration and type of user device 904, the memory 914 may be volatile (such as random access memory ("RAM")) and/or non-volatile (such as read-only memory (ROM), flash memory, etc.).

In some examples, the memory 914 may include a web service application 912 and a version of a resolution determination engine 910 (e.g., 910(1)). The web service application 912 and/or the resolution determination engine 910(1) may allow the user 906 to interact with the computer system 902 via the network 908. The user device 904 may also include one or more interfaces 918 to enable communication with other devices, systems, and the like. The resolution determination engine 910, whether embodied in the user device 904 or the computer system 902, may be configured to perform the techniques described herein.

The resolution determination engine 910 includes an image manager engine 942 and a distribution engine 944. In an example, the resolution determination engine 910 can include any other suitable engines, modules, models, and the like.

The image manager engine 942 can manage various tasks related to the generating and processing an image of a barcode chart. In an example, the image manager engine 942 may generate an image, may ingest an image, may input an image into a barcode decoder, may determine decoded barcodes based on a barcode manifest, and any other suitable tasks with respect to the images described herein.

The distribution engine 944 can include one or more computer services for determining a distribution of decode rates for barcode attributes based on information generated by the image manager engine 942. In an example, the distribution engine 944 may include a monotonic function. The distribution engine 944 may ingest decoded barcode rates, may apply the monotonic function to determine a distribution, may generate a resolution metric based on the distribution, may transmit or otherwise share the resolution metric, and any other suitable tasks.

Turning now to the details of the computer system 902, the computer system 902 may include one or more computer system computers, perhaps arranged in a cluster of servers or as a server farm, and may host web service applications.

The function of the computer system 902 may be implemented a cloud-based environment such that individual components of the computer system 902 are virtual resources in a distributed environment.

The computer system 902 may include at least one memory 920 and one or more processing units (or processor(s)) 922. The processor 922 may be implemented as appropriate in hardware, computer-executable instructions, software, firmware, or combinations thereof. Computer-executable instruction, software, or firmware implementations of the processor 922 may include computer-executable or machine-executable instructions written in any suitable programming language to perform the various functions described. The memory 920 may include more than one memory and may be distributed throughout the computer system 902. The memory 920 may store program instructions that are loadable and executable on the processor(s) 922, as well as data generated during the execution of these programs. Depending on the configuration and type of memory including the computer system 902, the memory 920 may be volatile (such as RAM and/or non-volatile (such as read-only memory ("ROM"), flash memory, or other memory)). The memory 920 may include an operating system 924 and one or more application programs, modules, or services for implementing the features disclosed herein including at least a version of the resolution determination engine 910 (e.g., 910(2)). For example, the resolution determination engine 910(2) may perform the functionality described herein.

The computer system 902 may also include additional storage 928, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 928, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 902 and/or part of the user device 904.

The computer system 902 may also include input/output (I/O) device(s) and/or ports 930, such as for enabling connection with a keyboard, a mouse, a pen, a voice input device, a touch input device, a display, speakers, a printer, or other I/O device.

In some examples, the computer system 902 may also include one or more user interface(s) 932. The user interface 932 may be utilized by an operator, curator, or other authorized user to access portions of the computer system 902. In some examples, the user interface 932 may include a graphical user interface, voice interfaces, web-based applications, programmatic interfaces such as APIs, or other user interface configurations.

The computer system 902 may also include a data store 901. In some examples, the data store 901 may include one or more databases, data structures, or the like for storing and/or retaining information associated with the computer system 902 and which, in some examples, may be accessible by the user devices 904. The resolution determination engine 910 is communicatively coupled (e.g., via a wired connection or a wireless connection) to the data store 901. The data store 901 includes an encoded information library 934 for one or more barcode manifests. In an example, the data store 901 can include any other suitable data, databases, libraries, and the like.

Figure 10:
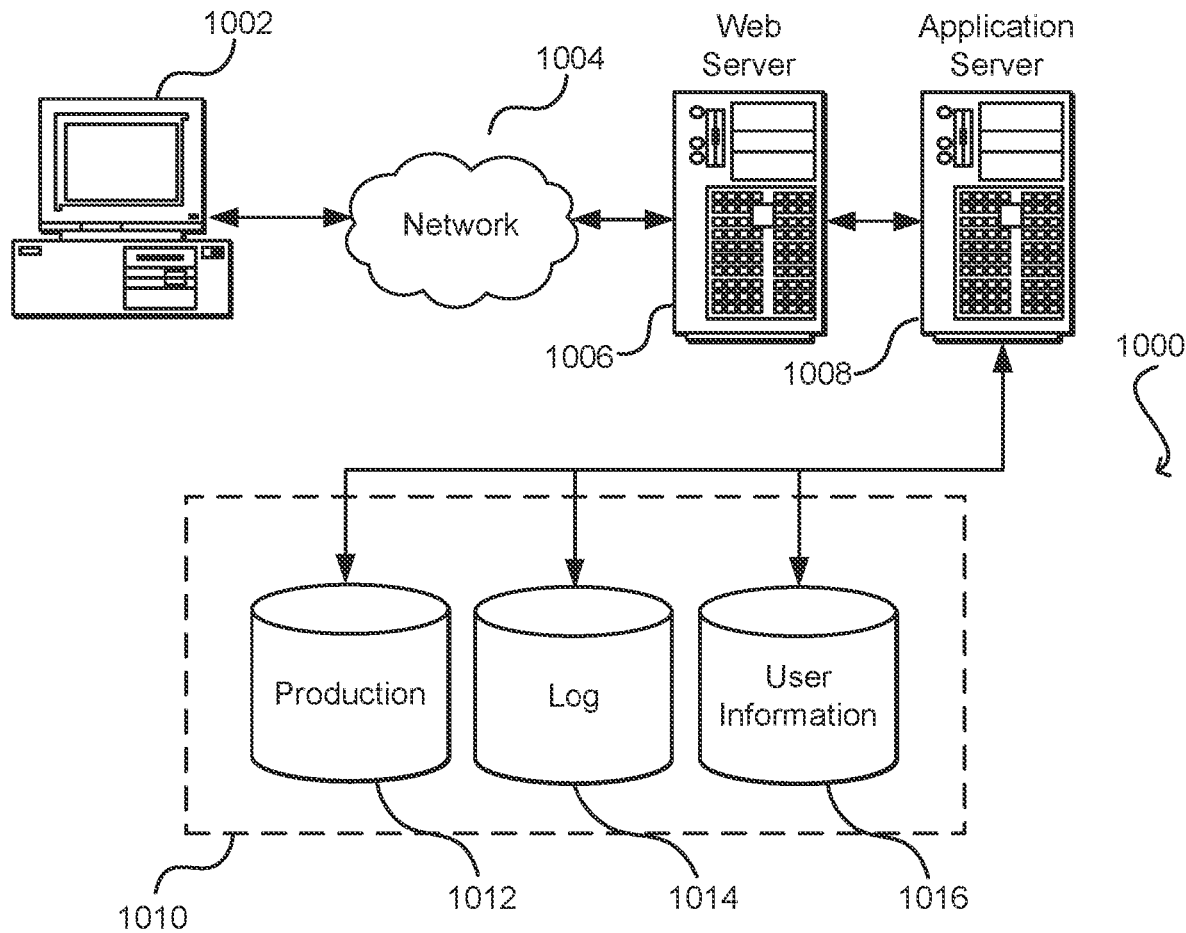
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
   one or more processors; and
   one or more memories storing instructions that, upon execution by the one or more processors, configure the system to:
   determine an aperture value and a working distance for a first lens of a camera of an image acquisition system based on a chart comprising a plurality of barcode sets, wherein a first subset of the plurality of barcode sets are arranged in a horizontal orientation and a second subset of the plurality of barcode sets are arranged in a vertical orientation, and wherein each barcode of a barcode set has a barcode attribute;
   define a barcode manifest comprising encoded information associated with individual barcodes of the plurality of barcode sets;
   receive a first image of the chart including the plurality of barcode sets, wherein the first image was generated by the camera having the first lens;
   decode the plurality of barcode sets in the first image using a barcode decoder;
   determine, for individual barcode attributes and in at least one of the horizontal orientation and the vertical orientation, a first number of decoded barcodes in the plurality of barcode sets that match the encoded information in the barcode manifest, wherein each barcode that matches the encoded information in the barcode manifest represents a decoded barcode;
   determine a first distribution of a first decode rate associated with the barcode attribute for the decoded barcodes by fitting a monotonic function based on the first number of decoded barcodes for the individual barcode attributes and in the at least one of the horizontal orientation and the vertical orientation that match the encoded information in the barcode manifest; and
   determine a first resolution metric of the image acquisition system in the at least one of the horizontal orientation and the vertical orientation for a target barcode decode rate based on the first distribution of the first decode rate associate with the barcode attribute for the decoded barcodes.

2. The system of claim 1, wherein the chart includes the plurality of barcode sets arranged in at least one row and at least one column, wherein the encoded information for the individual barcodes of the plurality of barcode sets comprises: (i) a location identifier indicating a first position of the barcode in the at least one row and a second position of the barcode in the at least one column, (ii) a size identifier indicating the barcode attribute of the barcode, and (iii) an orientation identifier of the horizontal orientation or the vertical orientation of the barcode.

3. The system of claim 1, wherein the one or more memory store further instructions that, upon execution by the one or more processors, configure the system to:
   receive a second image of the chart including the plurality of barcode sets, wherein the second image was generated by the camera of the image acquisition system having a second lens;
   decode the plurality of barcode sets in the second image using the barcode decoder;
   determine, for the second image and for the individual barcode attributes and in the at least one of the horizontal orientation and the vertical orientation, a second number of decoded barcodes in the plurality of barcode sets that match the encoded information in the barcode manifest, wherein each barcode that matches the encoded information in the barcode manifest represents a decoded barcode;
   determine, for the second image, a second distribution of a second decode rate associated with the barcode attribute for the decoded barcodes by fitting the monotonic function based on the second number of decoded barcodes for the individual barcode attributes and in the at least one of the horizontal orientation and the vertical orientation that match the encoded information in the barcode manifest; and
   determine a second resolution metric of the image acquisition system in the at least one of the horizontal orientation and the vertical orientation for the target barcode decode rate based on the second distribution of the second decode rate associated with the barcode attribute for the decoded barcodes.

4. The system of claim 3, wherein the one or more memory store further instructions that, upon execution by the one or more processors, configure the system to:
   select the second lens for use with the camera based on the first resolution metric and the second resolution metric.

5. A computer-implemented method, comprising:
   receiving an image of a chart comprising a plurality of barcode sets, wherein the image is captured by an image acquisition system having a camera with a lens, wherein the plurality of barcode sets are arranged in one or more orientations with respect to an optical axis of the camera, and wherein individual barcodes of a barcode set have a barcode attribute;
   decoding the plurality of barcode sets in the image using a barcode decoder;
   determining, for individual barcode attributes and for individual orientations of the one or more orientations, a number of decoded barcodes in the plurality of barcode sets that match encoded information associated with the individual barcodes of the plurality of barcode sets stored in a barcode manifest, wherein each barcode that matches the encoded information in the barcode manifest represents a decoded barcode; and determining a resolution metric of the image acquisition system for a target barcode decode rate based on a distribution of a decode rate associated with the barcode attribute for the decoded barcodes.

6. The computer-implemented method of claim 5, wherein the one or more orientations comprise a horizontal orientation and a vertical orientation, wherein a first subset of the plurality of barcode sets are arranged in the horizontal orientation and a second subset of the plurality of barcode sets are arranged in the vertical orientation, and wherein the barcode attribute of the individual barcodes of a barcode set is different from the barcode attribute of other barcodes of the barcode set.

7. The computer-implemented method of claim 6, wherein the chart includes the plurality of barcode sets arranged in at least one row and at least one column, wherein the encoded information for the individual barcodes of the plurality of barcode sets comprises: (i) a location identifier indicating a first position of the barcode in the at least one row and a second position of the barcode in the at least one column, (ii) a size identifier indicating the barcode attribute of the barcode, and (iii) an orientation identifier of the horizontal orientation or the vertical orientation of the barcode.

8. The computer-implemented method of claim 5, wherein the one or more orientations comprise a radial orientation and a tangential orientation, wherein a first subset of the plurality of barcode sets have the radial orientation and a second subset of the plurality of barcode sets have the tangential orientation.

9. The computer-implemented method of claim 8, wherein the encoded information for the individual barcodes of the plurality of barcode sets comprises: (i) a location identifier indicating a radial distance or a tangential distance of the barcode from the optical axis, (ii) a size identifier indicating the barcode attribute of the barcode, and (iii) an orientation identifier of the radial orientation or the tangential orientation of the barcode.

10. The computer-implemented method of claim 5, wherein the encoded information for the individual barcodes comprises a predefined number of digits, wherein a first subset of the digits are fixed for the individual barcodes of the plurality of barcode sets, a second subset of the digits represent a location identifier of the barcode, a third subset of the digits represent a size identifier for the barcode attribute of the barcode, and a fourth subset of the digits represent an orientation identifier of the barcode.

11. The computer-implemented method of claim 5, further comprising:
receiving another image of the chart generated by the image acquisition system having the camera with another lens,
decoding the plurality of barcode sets in the other image using the barcode decoder;
determining, for the other image, for the individual barcode attributes, and for the individual orientations of the one or more orientations, another number of decoded barcodes in the plurality of barcode sets that match the encoded information associated with the individual barcodes of the plurality of barcode sets stored in the barcode manifest;
determining another resolution metric of the image acquisition system for the target barcode decode rate based on another distribution of another decode rate associated with the barcode attribute for the decoded barcodes; and
selecting the other lens for use with the camera based on the resolution metric and the other resolution metric.

12. The computer-implemented method of claim 5, further comprising:
determining the distribution of the decode rate associated with the barcode attribute for the decoded barcodes by fitting a monotonic function based on the number of decoded barcodes, for the individual barcode attributes and in the individual orientations of the one or more orientations, that match the encoded information in the barcode manifest.

13. The computer-implemented method of claim 12, wherein the barcode attribute comprises an X dimension representing a width of a thinnest line in a barcode and the resolution metric corresponds to a resolving power representing an ability to distinguish line pair widths at the target barcode decode rate in images generated by the image acquisition system.

14. One or more non-transitory computer-readable storage media storing computer-executable instructions that, upon execution by one or more processors of a system, cause the system to perform operations comprising:
receiving an image of a chart comprising a plurality of barcode sets, wherein the image is captured by an image acquisition system having a camera with a lens, wherein the plurality of barcode sets are arranged in one or more orientations with respect to an optical axis of the camera, and wherein individual barcodes of a barcode set have a barcode attribute;
decoding the plurality of barcode sets in the image using a barcode decoder;
determining, for individual barcode attributes and for individual orientations of the one or more orientations, a number of decoded barcodes in the plurality of barcode sets that match encoded information associated with the individual barcodes of the plurality of barcode sets stored in a barcode manifest, wherein each barcode that matches the encoded information in the barcode manifest represents a decoded barcode; and
determining a resolution metric of the image acquisition system for a target barcode decode rate based on a distribution of a decode rate associated with the barcode attribute for the decoded barcodes.

15. The one or more non-transitory computer-readable storage media of claim 14, wherein the chart extends along at least two sides of a three-dimensional box with a first subset of the plurality of barcodes sets located on a first side of the three-dimensional box and a second subset of the plurality of barcode sets located on a second side of the three-dimensional box that is adjacent to the first side.

16. The one or more non-transitory computer-readable storage media of claim 15, wherein the encoded information for the individual barcodes of the plurality of barcode sets comprises: (i) a location identifier indicating a position of the barcode on the first side or the second side, (ii) a size identifier indicating the barcode attribute of the barcode, and (iii) a face identifier indicating the barcode being positioned on the first side or the second side.

17. The one or more non-transitory computer-readable storage media of claim 15 storing further instructions that, upon execution by the system, cause the system to perform additional operations comprising:
receiving one or more additional images of the chart, wherein the image and the one or more additional images are generated by the camera having a same aperture and working distance while the three-dimensional box is moved at different speeds with respect to the camera;

decoding the plurality of barcode sets in the image and the one or more additional images using the barcode decoder;

determining, for the image and individual images of the one or more additional images, the number of decoded barcodes in the plurality of barcode sets that match encoded information associated with the individual barcodes of the plurality of barcode sets stored in the barcode manifest; and determining, for the image and the individual images of the one or more additional images, the resolution metric of the image acquisition system for the target barcode decode rate based on the distribution of the decode rate associated with the barcode attribute for the decoded barcodes;

determining a performance metric associated with the resolution metric with respect to speed for the image and the one or more additional images.

18. The one or more non-transitory computer-readable storage media of claim 17 storing further instructions that, upon execution by the system, cause the system to perform additional operations comprising:

defining the speed for a movement of the three-dimensional box during a barcode scanning operation based on the performance metric.

19. The one or more non-transitory computer-readable storage media of claim 14 storing further instructions that, upon execution by the system, cause the system to perform additional operations comprising:

evaluating the resolution metric as a function of a contrast of the image.

20. The one or more non-transitory computer-readable storage media of claim 19 storing further instructions that, upon execution by the system, cause the system to perform additional operations comprising:

determining an adjustment for an analog gain setting or a light exposure setting for the camera based on the contrast.

\* \* \* \* \*